United States Patent Office 2,783,218
Patented Feb. 26, 1957

2,783,218

HYDROLYSIS OF POLYVINYL ESTERS

William L. Kuechler, Grand Island, N. Y., assignor to E. I. du Pont de Nemours and Company, Wilmington, Del., a corporation of Delaware No Drawing. Application August 26, 1953,
Serial No. 376,761

4 Claims. (Cl. 260—91.3)

This invention relates to the hydrolysis of polyvinyl esters, particularly polyvinyl acetate, with water in a system such that the ester and the resulting polyvinyl alcohol remain in solid form throughout the hydrolysis process.

Polyvinyl alcohol is generally produced commercially by alkaline alcoholysis of polyvinyl ester in solution in a non-aqueous solvent, usually an alcohol. The product is insoluble in the alcohol and must be dried and the solvent recovered for further use. Such processes are inherently costly because of solvent losses and because relatively complex processing equipment is necessary especially for recovering and recycling the solvent. It is known that water can be used in the hydrolysis of polyvinyl ester but the solubility of the polyvinyl alcohol in water renders the recovery of the polymer very difficult if it is desired in the solid dry form.

Accordingly, the present invention has as its chief object the aqueous hydrolysis of polyvinyl ester in the continuous solid phase from polyvinyl ester to polyvinyl alcohol. Another object is to provide a practical process for the hydrolysis of solid phase polyvinyl esters to polyvinyl alcohol without the use of any solvents. A further object is to provide for the rapid hydrolysis of polyvinyl esters. It is also an object to hydrolyze polyvinyl ester in such a way as to permit easy recovery of solid phase polyvinyl alcohol in a dry state. It is a still further object to eliminate the need for using the more expensive organic solvents in the hydrolytic production of polyvinyl alcohol. Other objects will be apparent during the further discussion of the invention.

This invention contemplates the hydrolysis of solid polyvinyl ester, specificially polyvinyl acetate, in a form having high surface to volume ratio such as in beads, powders or films in such a way that the final polyvinyl alcohol produced retains the same physical form or shape as the polyvinyl ester started with. Water can be used as the hydrolytic medium together with hydrolytic catalytic agents such as strong acids, organic acids or acidic complexes. With liquid water medium sufficient insolubilizing agent must be present to prevent solution of the polyvinyl alcohol in the hydrolytic medium. Preferably, the flow of the hydrolytic medium is counter to the flow of the solid resin. The acid corresponding to the ester hydrolyzed, specifically acetic acid in the case of polyvinyl acetate, can accumulate in the aqueous hydrolytic medium to concentrations permitting economical recovery. Conditions of time, temperature, catalyst type and concentration, and amounts of water used will determine the degree of hydrolysis and can be readily controlled.

The following examples illustrate several procedures for practicing my invention:

Example 1

A solution was prepared containing 180 g. water, 51 g. sulfuric acid (98%), 30 g. glacial acetic acid and 39 g. boric acid. To this solution, 50 g. of "Elvacet" 12–700 beads was added. "Elvacet" 12–700 is a polyvinyl acetate whose molal solution in benzene is 400 to 800 cp. viscosity and the derived polyvinyl alcohol has a viscosity of about 50 to 60 cp. in a 4% aqueous solution. The mixture was heated to 105° C. over a 60 minute period in an open vessel provided with a stirrer to keep the beads in suspension. Water was added slowly to make up for losses due to evaporation. The solution was held at 103 to 105° C. for 70 minutes and was then cooled to room temperature.

The solution was decanted and the beads washed thoroughly with ice water. This was followed by a methanol wash containing a trace of sodium acetate. The beads were then dried in a vacuum oven. Tests indicated the beads of polyvinyl acetate had been hydrolyzed about 97% to polyvinyl alcohol. The product was soluble in hot water and remained in solution when cooled.

Example 2

A solution was prepared containing 200 g. water, 51 g. sulfuric acid (98%), 40 g. glacial acetic acid, and 39 g. boric acid. To this solution, 50 g. of polyvinyl acetate beads of the same grade as used in the preceding example was added.

The mixture was stirred to retain the beads in suspension and heated in an open vessel to a temperature of 85° C. during a 15 minute period. The temperature was maintained at 70–80° C. during the next 45 minutes and then raised to 105° C. during the next 25 minutes. At this point, the beads agglomerated to a gelatinous mass which was redispersed by adding cold water and stirring.

The liquid layer was decanted and replaced by a mixture of 210 g. water, 51 g. sulfuric acid (98%), and 39 g. boric acid previously heated to 70° C. The solid was redispersed by stirring and the mixture heated at the boiling point for 30 minutes after which it was cooled to room temperature, diluted with water and the liquid decanted. The solid product, consisting of agglomerated beads, was washed with water to remove boric acid after which it was soluble in hot water and remained in solution on cooling. This indicated partial hydrolysis of the polyvinyl acetate to polyvinyl alcohol.

Example 3

A solution was prepared containing 180 g. water, 51 g. sulfuric acid (98%), 30 g. acetic acid, and 39 g. boric acid. To this solution, 50 g. of polyvinyl acetate beads of the same grade as used in the preceding example was added.

The mixture was stirred to keep the beads in suspension and heated slowly in an open vessel until at the end of 130 minutes a temperature of 104° C. was reached, cold water being added gradually to prevent excessive losses from evaporation. The temperature was maintained at 104–105° C. during the next 20 minutes after which the mixture was rapidly cooled and poured onto a filter. The beads were washed in succession with cold water, methanol, methanol saturated with sodium acetate and methanol after which they were dried under vacuum at 50° C. The product was hydrolyzed to the extent of approximately 93%.

Example 4

In an experiment similar to Example 3, using the same materials and quantities but in which the temperature of the mixture was maintained at 100–104° C. for 3¼ hours, a product which was about 97% hydrolyzed was obtained.

The hydrolysis of polyvinyl acetate by water is very slow at room temperatures. With strong acid catalysts, practical rates can be obtained at temperatures above 50° C. When catalyzed only by the acetic acid formed, temperatures above 100° C. are desirable for reasonable reaction rates. Temperatures above 100° C. are limited only by chemical or physical degradation of the polymer, such as softening and coagulation of the beads, which will vary with the amount and type of catalyst and solubility characteristics of the polymer.

Operating pressure is a dependent function of operating temperature and affects the process chiefly as required to maintain the desired temperature.

Use of highly ionized acid catalysts promotes the rate of reaction and permits operation at lower temperatures. With 15%–20% sulfuric acid, the reaction can be carried out at 100° C. in approximately 2 hours. With no catalyst except the acetic acid formed in the reaction, a temperature of approximately 150° C. would be required for approximately similar reaction times. A minimum catalyst content is desirable to reduce subsequent purification treatments and for economy of operation but, chemically, the amount is limited only by degrading effects on the polymer at high concentrations.

In liquid phase operation, the amount of precipitating or insolubilizing agent used should be the minimum necessary to prevent solution of the polyvinyl alcohol at the operating temperature.

The amount of insolubilizing agent required will vary with the agent used, temperature, inherent viscosity of the polymer and other factors. Thus, at room temperature, low concentrations of about 4% of materials such as $Na_2CO_3$, $Na_2SO_4$, $K_2SO_4$ and $H_3BO_3$ will effectively prevent solution of polyvinyl alcohol in the hydrolytic reaction medium, while higher concentrations, in the region up to 25% concentrations, of other agents such as NaCl, $ZnSO_4$, $Na_3PO_4$ and $CaCl_2$, etc., may be required. Organic materials will also prevent solution of the polyvinyl alcohol when present in adequate concentrations in the aqueous hydrolysis medium.

A wide range of materials can be used in addition to those listed to prevent the polyvinyl alcohol from going into solution in the reaction medium as it is formed. These include many inorganic salts compatible with the reaction medium; organic solvents, such as methyl alcohol, acetone, etc.; and organic agents such as dyes and indicators known to insolubilize polyvinyl alcohol in aqueous media. This invention is not limited to the use of any specific insolubilizing or precipitatng agent in the reaction medium. As the temperature of the reaction system rises, the amount of insolubilizer for the polyvinyl alcohol tends to increase slightly but the effect is not great and is generally such that as 100° C. is approached, the amount of insolubilizer needed will be increased by about 25%.

The permissible range of water-acetic acid concentrations is limited only by practical operating conditions. It is theoretically possible to introduce 100% water at one end of the reactor, countercurrent to polyvinyl acetate beads, and remove 100% acetic acid from the opposite end. However, polyvinyl acetate is softened or dissolved at very high acetic acid concentrations. The inlet concentration of acetic acid must be low since the hydrolysis is an equilibrium reaction. That is, a solution of 20% acetic acid and 80% water is in equilibrium with polyvinyl alcohol that is roughly 96% hydrolyzed. Therefore, for completely hydrolyzed polyvinyl alcohol (98%–99% hydrolyzed), an inlet acetic acid concentration below 10% is necessary.

The catalyst may be the organic acid formed in the reaction or any material producing a pH below about 6 or 7 in water solution, including inorganic and organic acids, salts, complexes, etc. Any hydrolytic catalysts may be used since the significance of this invention relates to keeping the polyvinyl alcohol product as formed substantially insoluble in the hydrolytic medium. Thus, although acid hydrolysis catalysts or agents are preferred basic catalysts, such as alkali hydroxides or basic salts can be used in the presence of agents which insolubilize the polyvinyl alcohol formed in the hydrolytic medium.

In general, as catalyst concentration in the aqueous hydrolysis medium is increased, the rate of reaction may be expected to increase. In the case of inorganic acids, such as hydrochloric and sulfuric, the catalyst concentration will be above about 1% by weight of the reaction medium and the preferred concentration range will be between about 2.0 to about 25% by weight of the aqueous hydrolytic system.

Polyvinyl acetate or other polyvinyl esters of organic acids, such as polyvinyl formate, polyvinyl propionate or the polyvinyl butyrates could be employed for production of polyvinyl alcohol by this process.

While beads of polyvinyl acetate of a size between about 10 and 40 mesh are satisfactory for carrying on the solid phase hydrolysis in aqueous media, there is no intent to limit the invention to this range. Depending upon the end objectives for the produced polyvinyl alcohol, any reasonably sized solid particles of polyvinyl acetate may be used. However, as the size or thickness of the layer to be penetrated by the hydrolytic agents is increased, there will be greater difficulty in controlling the exact degree of hydrolysis to be achieved. When nearly complete hydrolysis is desired, the thickness of the particle subjected to reaction is of lesser importance than if partial hydrolysis is to be uniformly achieved throughout the solid mass. It is also apparent that films, sheets, rods and filaments of polyvinyl esters may be hydrolyzed with the use of insolubilizing agent and no limitation in respect to such shapes is intended, except that the thicknesses to be penetrated by the hydrolytic agents will generally be held below about one-half inch.

I claim:

1. The process of converting preformed solid phase polyvinyl acetate directly into solid phase polyvinyl alcohol of substantially the preformed solid shape of the polyvinyl acetate comprising subjecting said polyvinyl acetate in a preponderantly aqueous medium to aqueous hydrolysis by hydrolysis catalyst in the presence of insolubilizing agent for said polyvinyl alcohol, said agent being selected from the group consisting of alkali metal carbonates, sulfates, phosphates, chlorides, calcium chloride and boric acid.

2. The process of converting preformed solid phase polyvinyl acetate directly into solid phase polyvinyl alcohol of substantially the preformed solid shape of the polyvinyl acetate in a preponderantly aqueous medium comprising subjecting said polyvinyl acetate to aqueous hydrolysis by hydrolysis catalyst in the presence of boric acid in amount to insolubilize said polyvinyl alcohol.

3. The process of converting preformed solid phase polyvinyl acetate directly into solid phase polyvinyl alcohol of substantially the preformed solid shape of the polyvinyl acetate comprising subjecting said polyvinyl acetate in a preponderantly aqueous medium to aqueous hydrolysis by acid hydrolysis catalyst in the presence of insolubilizing agent for said polyvinyl alcohol, said agent being selected from the group consisting of alkali metal carbonates, sulfates, phosphates, chlorides, calcium chloride and boric acid.

4. The process of converting preformed solid phase polyvinyl acetate directly into solid phase polyvinyl alcohol of substantially the preformed solid shape of the polyvinyl acetate comprising subjecting said polyvinyl acetate in a preponderantly aqueous medium to aqueous hydrolysis by acid hydrolysis catalyst in the presence of boric acid in amount to insolubilize said polyvinyl alcohol.

References Cited in the file of this patent

UNITED STATES PATENTS

| | | |
|---|---|---|
| 2,427,126 | Dreyfus | Sept. 9, 1947 |
| 2,445,555 | Binda | July 20, 1948 |
| 2,502,715 | Germain | Apr. 4, 1950 |
| 2,629,713 | Goebel | Feb. 24, 1953 |